(12) United States Patent
Lee et al.

(10) Patent No.: US 11,935,406 B2
(45) Date of Patent: *Mar. 19, 2024

(54) VEHICLE LOCALIZATION METHOD FOR URBAN ENVIRONMENT USING ROAD TRAFFIC INFRASTRUCTURE AND WIRELESS COMMUNICATION TECHNOLOGY

(71) Applicant: UIF (University Industry Foundation), Yonsei University, Seoul (KR)

(72) Inventors: Chung Yong Lee, Seoul (KR); Yeong Hwan Kim, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 12 days.

This patent is subject to a terminal disclaimer.

(21) Appl. No.: 17/844,610

(22) Filed: Jun. 20, 2022

(65) Prior Publication Data
US 2022/0319319 A1 Oct. 6, 2022

Related U.S. Application Data

(63) Continuation of application No. 17/334,509, filed on May 28, 2021, now Pat. No. 11,398,154.

(30) Foreign Application Priority Data

Nov. 27, 2020 (KR) .................. 10-2020-0161959
Apr. 27, 2021 (KR) .................. 10-2021-0054256

(51) Int. Cl.
*G08G 1/123* (2006.01)
*G08G 1/01* (2006.01)
*G08G 1/052* (2006.01)
*G08G 1/07* (2006.01)
*H04W 4/44* (2018.01)

(52) U.S. Cl.
CPC ............. *G08G 1/123* (2013.01); *G08G 1/012* (2013.01); *G08G 1/0125* (2013.01); *G08G 1/052* (2013.01); *G08G 1/07* (2013.01); *H04W 4/44* (2018.02)

(58) Field of Classification Search
CPC ...... G08G 1/123; G08G 1/012; G08G 1/0125; G08G 1/052; G08G 1/07; H04W 4/44
See application file for complete search history.

(56) References Cited

U.S. PATENT DOCUMENTS

| 2016/0035223 | A1 | 2/2016 | Gutmann et al. |
| 2017/0124864 | A1* | 5/2017 | Popple ............. G08G 1/096758 |
| 2018/0293884 | A1* | 10/2018 | Liu ...................... G08G 1/0112 |

FOREIGN PATENT DOCUMENTS

| JP | 2010103945 A | 5/2010 |
| JP | 2010108460 A | 5/2010 |
| KR | 20170090672 A | 8/2017 |
| KR | 20180040760 A | 4/2018 |
| KR | 101962181 B1 | 3/2019 |
| KR | 20190061395 A | 6/2019 |

* cited by examiner

*Primary Examiner* — Joseph H Feild
*Assistant Examiner* — Sharmin Akhter

(57) ABSTRACT

According to the present exemplary embodiments, provided are a traffic signal system and a vehicle which estimate a position and a moving direction of a vehicle in accordance with a driving status of the vehicle at an intersection and improve a positioning accuracy based on wired or wireless communication.

6 Claims, 6 Drawing Sheets

VEHICLE LOCALIZATION METHOD FOR URBAN ENVIRONMENT USING ROAD TRAFFIC INFRASTRUCTURE AND WIRELESS COMMUNICATION TECHNOLOGY

CROSS-REFERENCE TO RELATED APPLICATIONS

This application is a Continuation Application of U.S. application Ser. No. 17/334,509 filed May 28, 2021 which claims the benefit of Korean Patent Application No. 10-2020-0161959 filed in the Korean Intellectual Property Office on Nov. 27, 2020, Korean Patent Application No. 10-2021-0054256 filed in the Korean Intellectual Property Office on Apr. 27, 2021, the entire contents of which are incorporated herein by reference.

TECHNICAL FIELD

The technical field of the present disclosure relates to a traffic signal system which is capable of localizing a vehicle in an urban environment and a vehicle which communicates with the traffic signal system.

BACKGROUND ART

The contents described in this section merely provide background information on the present exemplary embodiment but do not constitute the related art.

The localization of the vehicle requires a very precise positioning accuracy, but the localization technique using a global positioning system (GPS) of the related art does not have a high positioning accuracy in an urban environment.

RELATED ART DOCUMENT

Patent Document

Patent Document 1: US 2016/0035223 (2016 Feb. 4.)
Patent Document 2: KR 10-1962181 (registered on Mar. 20, 2019)
Patent Document 3: KR 10-2019-0061395 (published on Jun. 5, 2019)
Patent Document 4: KR 10-2018-0040760 (published Apr. 23, 2018)

SUMMARY OF THE INVENTION

A major object of exemplary embodiments of the present disclosure is to estimate a position and a moving direction of a vehicle in accordance with a driving status of a vehicle at an intersection based on communication between a vehicle and a traffic signal system.

Other and further objects of the present invention which are not specifically described can be further considered within the scope easily deduced from the following detailed description and the effect.

According to an aspect of the present embodiment, a vehicle includes a first communication unit which transmits and receives a message to and from a traffic signal system; a first processor which is connected to the first communication unit, classifies a driving status of the vehicle into a stop status, a departure status, and a moving status, and processes a message which is transmitted and received to and from the traffic signal system in different ways in accordance with the stop status, the departure status, and the moving status; and a moving device which is connected to the first processor and moves the vehicle.

The traffic signal system includes a plurality of signal lights installed in different positions in an intersection. In the stop status, the first communication unit periodically transmits an arrival message to the traffic signal system, when the traffic signal in the traveling direction of the vehicle is a red signal, receives an arrival response message and a stop status message from the traffic signal system, the first communication unit transmits the stop status response message and a pilot signal for positioning to the traffic signal system, and the first communication unit receives a vehicle position message estimated by the plurality of signal lights installed in different positions of the intersection using an arrival time and an intensity of the pilot signal.

The traffic signal system includes signal lights installed at a plurality of adjacent intersections. In the departure status, when a traffic signal for a traveling direction of the vehicle is changed to a green signal, the first communication unit receives a departure available message from the traffic signal system, the first communication unit receives the departure available message and after a predetermined standby time has elapsed, transmits a departure status response message and a pilot signal for positioning to the traffic signal system, and the signal light which receives the departure status response message transmits a vehicle entry message to a traffic signal of the next intersection in consideration of the position and the moving direction of the vehicle estimated using the pilot signal.

The traffic signal system includes signal lights installed at a plurality of adjacent intersections. In the departure status, without considering a traffic signal for the traveling direction of the vehicle, the first communication unit transmits the departure status response message and a pilot signal for positioning to the traffic signal system, and the signal light which receives the departure status response message transmits a vehicle entry message to a traffic signal of the next intersection in consideration of the position and the moving direction of the vehicle estimated using the pilot signal.

The traffic signal system includes signal lights installed at a plurality of adjacent intersections. In the moving status, the first communication unit periodically transmits an arrival message to the traffic signal system, when the traffic signal in the traveling direction of the vehicle is a green signal, receives an arrival response message and a moving status message from the traffic signal system, the first communication unit transmits the moving status response message and a pilot signal for positioning to the traffic signal system, the signal light which receives the moving status response message transmits a vehicle entry message to a traffic signal of the next intersection in consideration of the position and the moving direction of the vehicle estimated using the pilot signal, and the signal light which receives the moving status response message receives a vehicle position message estimated using the pilot signal, the moving speed and the moving direction of the vehicle.

According to another aspect of the present embodiment, a traffic signal system includes: a second communication unit which transmits and receives messages to and from a vehicle; and a second processor which is connected to the second communication unit and processes a message which is transmitted and received to and from the traffic signal system in different ways in accordance with a driving status of the vehicle which is classified into a stop status, a departure status, and a moving status.

The traffic signal system includes a plurality of signal lights installed in different positions in an intersection. In the stop status, the second communication unit receives an arrival message from the vehicle, when the traffic signal in the traveling direction of the vehicle is a red signal, the second communication unit transmits an arrival response message and a stop status message to the vehicle, the second communication unit receives the stop status response message and the pilot signal for positioning from the vehicle, the second communication unit localizes a vehicle by a plurality of signal lights installed in different positions of the intersection using an arrival time and an intensity of the pilot signal, and the second communication unit may transmit a vehicle position message for the position of the vehicle to the vehicle.

The traffic signal system includes signal lights installed at a plurality of adjacent intersections. In the departure status, when a traffic signal for a traveling direction of the vehicle is changed to a green signal, the second communication unit transmits a departure available message to the vehicle, the second communication unit receives the departure status response message and the pilot signal for positioning from the vehicle, and the second processor estimates the position and the moving direction of the vehicle using the pilot signal, the second communication unit transmits the vehicle entry message to a traffic signal of the next intersection.

The traffic signal system includes signal lights installed at a plurality of adjacent intersections. In the departure status, the second communication unit receives the departure status response message and the pilot signal for positioning from the vehicle before transmitting the departure available message to the vehicle, and the second processor estimates the position and the moving direction of the vehicle using the pilot signal, and the second communication unit transmits the vehicle entry message to a traffic signal of the next intersection.

The traffic signal system includes signal lights installed at a plurality of adjacent intersections. In the moving status, the second communication unit receives an arrival message from the vehicle, when the traffic signal in the traveling direction of the vehicle is a green signal, the second communication unit transmits an arrival response message and a moving status message to the vehicle, the second communication unit receives the moving status response message and the pilot signal for positioning from the vehicle, the second processor estimates the position and the moving direction of the vehicle using the pilot signal, the second communication unit transmits the vehicle entry message to a traffic signal of the next intersection, the second communication unit localizes the vehicle using the pilot signal, the moving speed and the moving direction of the vehicle, and the second communication unit transmits the vehicle position message for the position of the vehicle to the vehicle.

As described above, according to the exemplary embodiments of the present disclosure, it is possible to estimate a position and a moving direction of a vehicle in accordance with a driving status of the vehicle at the intersection based on communication between the vehicle and the traffic signal system and improve the positioning accuracy.

Even if the effects are not explicitly mentioned here, the effects described in the following specification which are expected by the technical features of the present disclosure and their potential effects are handled as described in the specification of the present disclosure.

DETAILED DESCRIPTION OF THE EMBODIMENT

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

Figure 1:
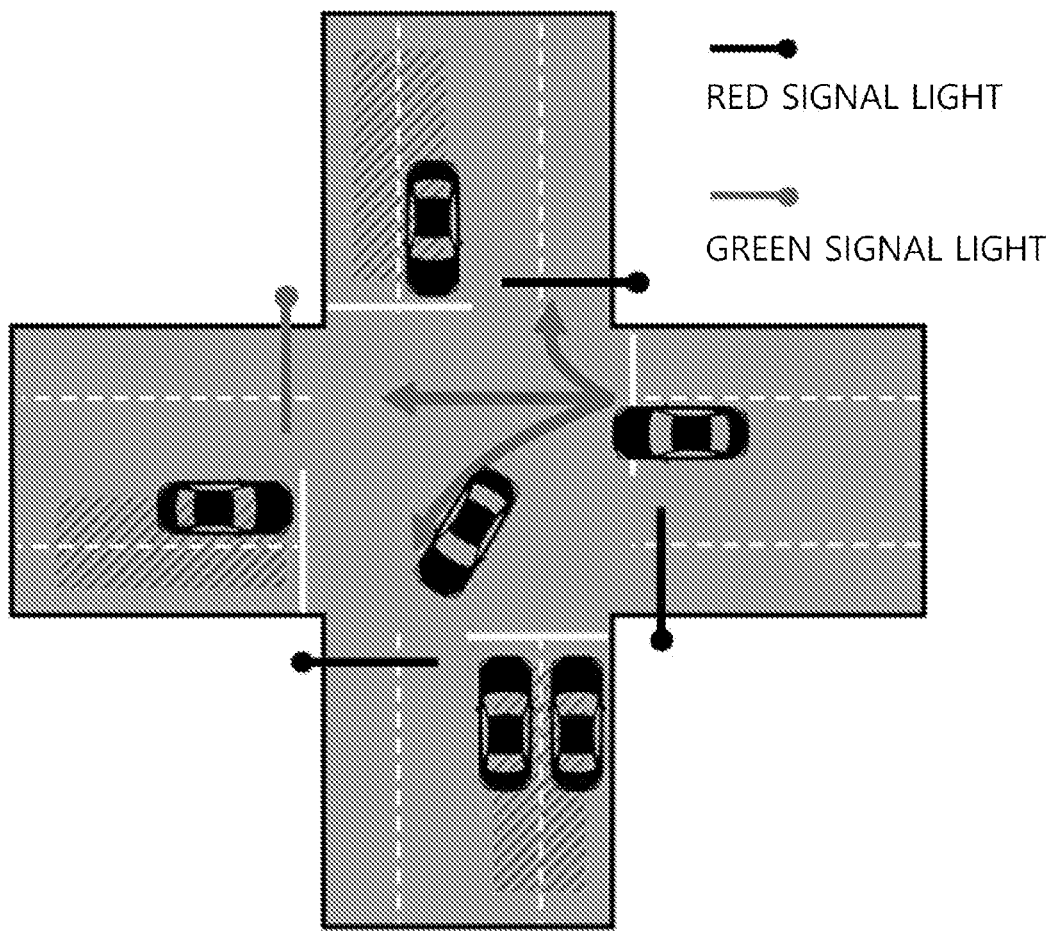
FIG. 1 is a view illustrating an intersection in accordance with a traffic signal system.
Figure 2:
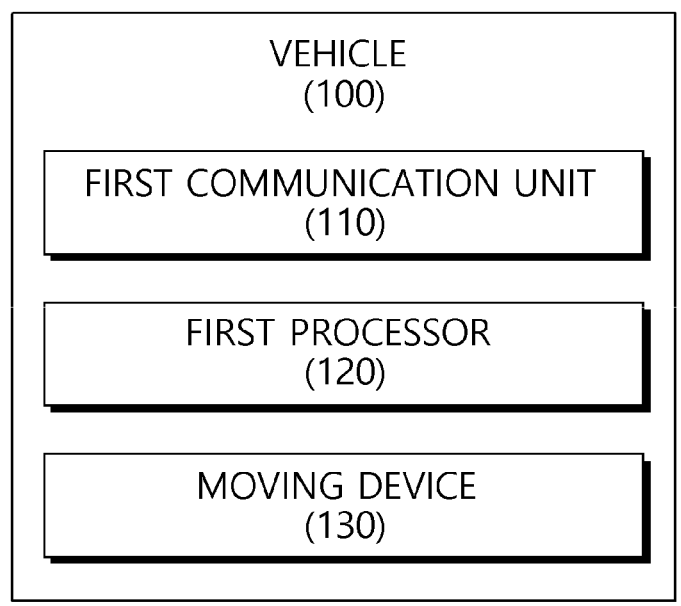
FIG. 2 is a block diagram illustrating a vehicle according to an exemplary embodiment of the present disclosure.
Figure 3:
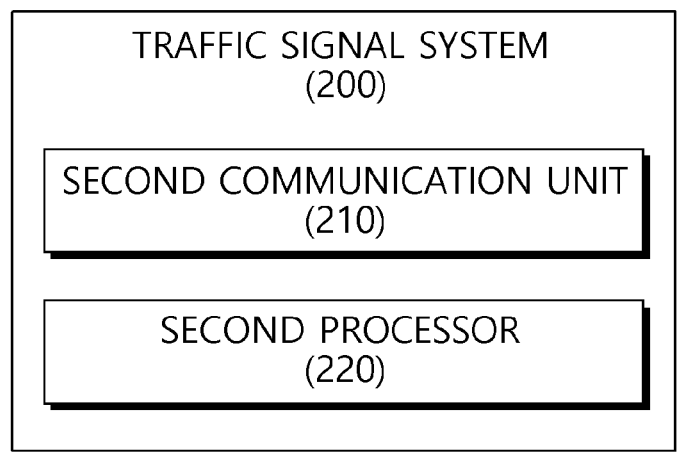
FIG. 3 is a block diagram illustrating a traffic signal system according to another exemplary embodiment of the present disclosure.

FIG. 1 is a view illustrating an intersection in accordance with a traffic signal system; FIG. 2 is a block diagram illustrating a vehicle according to an exemplary embodiment of the present disclosure, and FIG. 3 is a block diagram illustrating a traffic signal system according to another exemplary embodiment of the present disclosure.

In the present disclosure, a driving status of the vehicle is classified into a stop status, a departure status, and a moving status. According to the present disclosure, different operations are performed depending on the driving status of the vehicle.

In the stop status, the traffic signal system performs highly precise localization.

In the departure status, the traffic signal system estimates a moving direction of the vehicle, and transmits vehicle entry information to an intersection that the vehicle reaches when the vehicle travels in an estimated moving direction and performs hand-off.

In the moving status, the traffic signal system corrects the position in real time to improve estimation accuracy.

In each status, signals may be transmitted and received between the vehicle and the system. The vehicle and the traffic signal system exchange different messages depending on each status. The message may have different configurations and transmission methods in accordance with a communication specification used by the system.

The localization system of the present disclosure may be used using road traffic facility and infrastructures. Specifically, the localization system is used to be linked with the traffic signal system to more accurately localize. The localization system may be used to be installed in traffic lights provided at intersections.

Wireless communication used in the present exemplary embodiment may be used in accordance with various types of communication methods and specifications such as commercialized mobile communication techniques (LTE or NR) and dedicated short range communication (DSRC). For example, a next-generation mobile communication such as 5G or 6G may be applied.

The localization system includes a vehicle 100 and a traffic signal system 200.

The vehicle 100 includes a first communication unit 110, a first processor 120, and a moving device 130. The vehicle 100 may be an autonomous vehicle.

The first communication unit 110 transmits and receives messages to and from the traffic signal system 200.

The first processor 120 is connected to the first communication unit 110 and classifies a driving status of the vehicle 100 into a stop status, a departure status, and a moving status. The first processor 120 processes the message transmitted and received to and from the traffic signal system 200 in different ways in accordance with the step status, the departure status, and the moving status.

The vehicle 100 may correct its own position information or correct a traveling plan using a received position message.

The moving device 130 is connected to the first processor 120 to move the vehicle 100. The moving device may be a driving device with wheels.

The traffic signal system 200 includes a second communication unit 210 and a second processor 220. The traffic signal system 200 may include a plurality of signal lights installed in different positions at the intersection. The traffic signal system 200 may include a plurality of signal lights installed at a plurality of adjacent intersections.

The second communication unit 210 transmits and receives messages to and from the vehicle 100.

The second processor 220 is connected to the second communication unit 210 and processes the message transmitted and received to and from the vehicle in different ways depending on the driving status of the vehicle which is classified into a stop status, a departure status, and a moving status.

Figure 4:
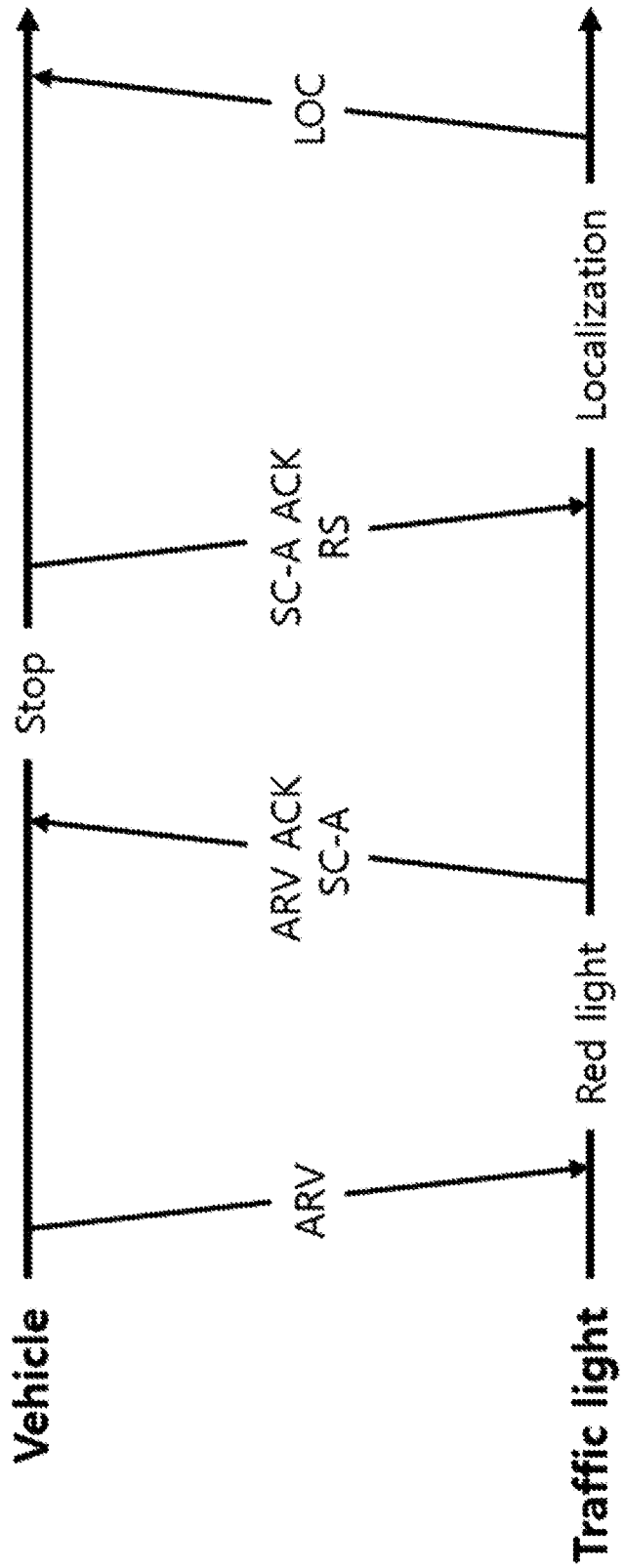
FIG. 4 is a view illustrating a message which is transmitted and received between a vehicle and a traffic signal system according to exemplary embodiment of the present disclosure in a stop status.

FIG. 4 is a view illustrating a message which is transmitted and received between a vehicle and a traffic signal system according to exemplary embodiment of the present disclosure in a stop status.

The vehicle periodically transmits an ARV message (arrival information of a vehicle). A traffic light of the intersection receives the ARV message to confirm that the vehicle enters and identify a traffic signal in a traveling direction of the vehicle. When a traffic signal in a traveling direction of the vehicle is a red signal, the traffic light transmits a SC-A message (confirm a status A) to the vehicle together with an ARV ACK message (a response for the ARV message). The vehicle which receives the ARV ACK and SC-A transmits an RS (a pilot signal for positioning) together with a SC-A ACK message (a response for SC-A) after stopping. After receiving SC-A ACK, traffic signals installed in different positions of the intersection localizes the vehicle using a difference in arrival times of RS signals transmitted by the vehicle and a difference in magnitudes of received signals. After completing the localization, the traffic light transmits an LOC message (information about localized location) to the vehicle.

In the stop status, the first communication unit of the vehicle periodically transmits the arrival message to the traffic signal system. When the traffic signal in the traveling direction of the vehicle is a red signal, the first communication unit receives an arrival response message and a stop status message from the traffic signal system. The first communication unit transmits the stop status response message and a pilot signal for positioning to the traffic signal system. The first communication unit receives the estimated vehicle position message using an arrival signal and a signal intensity of the pilot signal by a plurality of traffic lights installed in different positions at the intersection.

In the stop status, the second communication unit of the traffic signal system receives the arrival message from the vehicle. When the traffic signal in the traveling direction of the vehicle is a red signal, the second communication unit transmits an arrival response message and a stop status message to the vehicle. The second communication unit receives the stop status response message and the pilot signal for positioning from the vehicle. The second processor localizes the vehicle using an arrival time of and a signal intensity the pilot signal by a plurality of signal lights installed in different positions in the intersection. The second communication unit transmits a vehicle position message for the position of the vehicle to the vehicle.

Figure 5:
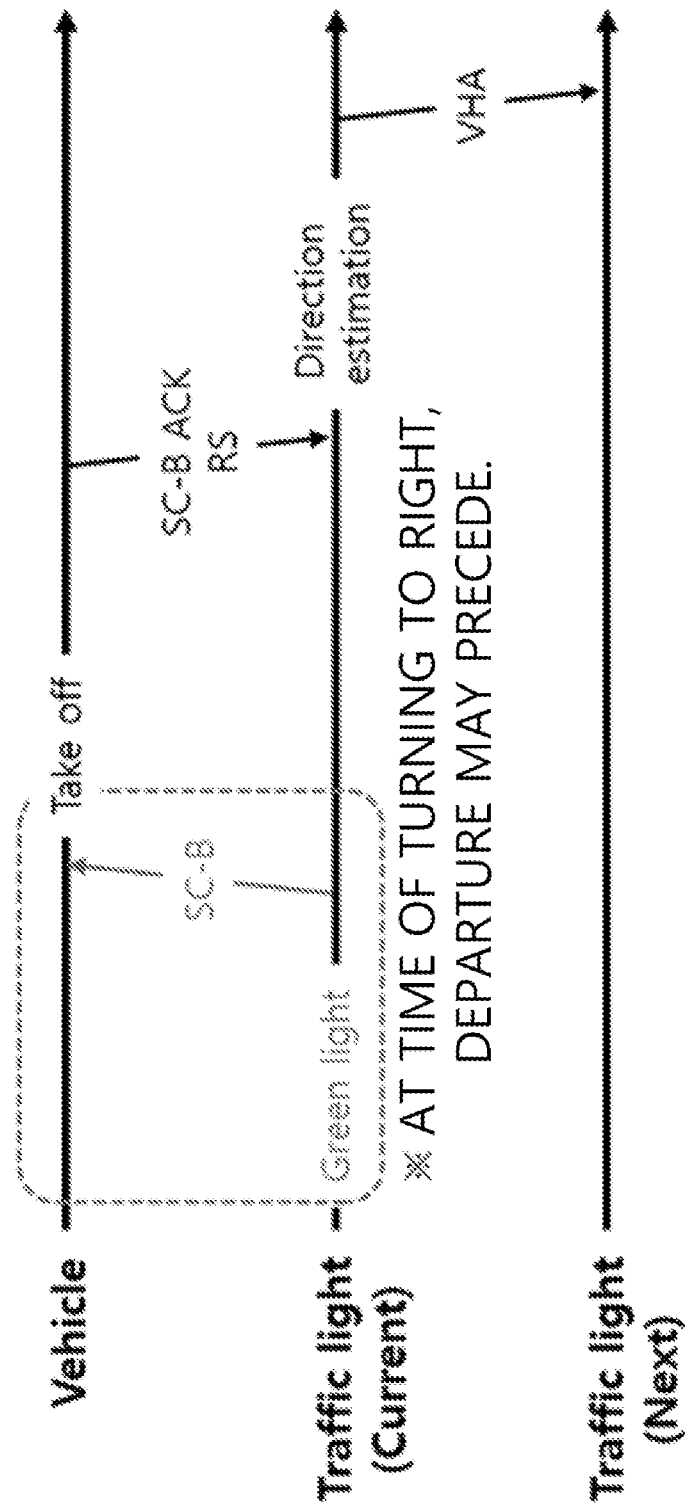
FIG. 5 is a view illustrating a message which is transmitted and received between a vehicle and a traffic signal system according to exemplary embodiment of the present disclosure in a departure status.

FIG. 5 is a view illustrating a message which is transmitted and received between a vehicle and a traffic signal system according to exemplary embodiment of the present disclosure in a departure status.

The departure of the vehicle is classified into departure which requires a signal (to go straight and turn to the left in Korea) and departure which does not require a signal (to turn to the right in Korea). If a signal is required, when a traffic signal is changed to a green signal, the signal light transmits a SC-B message (to confirm a status B) to vehicles which travel in the corresponding direction. The vehicle receives the SC-B message and starts accelerating and then transmits RS together with the SC-B ACK message (a response for SC-B) after a predetermined time has elapsed. In a circumstance in which the vehicle transmits the SC-B ACK message after a predetermined standby time has elapses since the traffic signal system transmits the SC-B message, the traffic signal system determines that the moving direction of the vehicle is a straight route and a left-turn route (lane). The signal light which receives the SC-B ACK localizes the vehicle using the RS to estimate a moving direction of the vehicle.

A VHA message (entry information of the vehicle) is transmitted to a next intersection at which the vehicle runs to arrive using the estimated moving direction of the vehicle and hand-off is performed. If the vehicle moves to a direction which does not require a signal, the vehicle transmits the SC-B ACK without receiving the SC-B message to perform the same process described above. In a circumstance in which the SC-B ACK message is received before transmitting the SC-B message, the traffic signal system determines that the moving direction of the vehicle is a right turn route (lane).

In a departure status which requires a signal, if the traffic signal for the traveling direction of the vehicle is changed to the green signal, the first communication unit of the vehicle receives a departure available message from the traffic signal system. The first communication unit transmits a departure status response message and a pilot signal for positioning to the traffic signal system after a predetermined standby time has elapsed since the first communication unit receives the departure available message. The signal light which receives the departure status response message transmits a vehicle entry message to a traffic signal of the next intersection in consideration of the position and the moving direction of the vehicle estimated using the pilot signal.

In a departure status which requires a signal, if the traffic signal for the traveling direction of the vehicle is changed to the green signal, the second communication unit of the traffic signal system transmits a departure available message to the vehicle. The second communication unit receives the departure status response message and the pilot signal for positioning from the vehicle. The second processor estimates the position and the moving direction of the vehicle using the pilot signal. The second communication unit transmits the vehicle entry message to a traffic signal of the next intersection.

In a departure status which does not require a signal, the first communication unit transmits the departure status response message and the pilot signal for positioning to the traffic signal system without considering the traffic signal for the traveling direction of the vehicle. The signal light which receives the departure status response message transmits a vehicle entry message to a traffic signal of the next intersection in consideration of the position and the moving direction of the vehicle estimated using the pilot signal.

In a departure status which does not require a signal, the second communication unit of the traffic signal system receives the departure status response message and the pilot signal for positioning from the vehicle before transmitting the departure available message to the vehicle. The second processor estimates the position and the moving direction of the vehicle using the pilot signal. The second communication unit transmits the vehicle entry message to a traffic signal of the next intersection.

Figure 6:
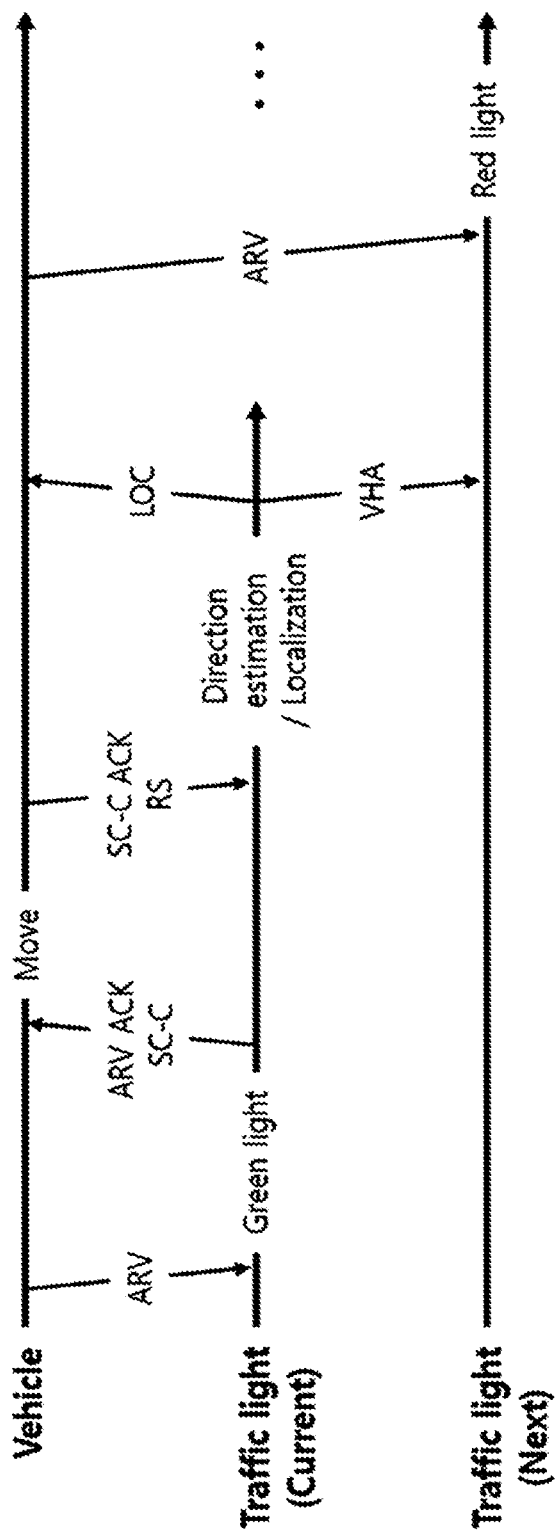
FIG. 6 is a view illustrating a message which is transmitted and received between a vehicle and a traffic signal system according to exemplary embodiment of the present disclosure in a moving status.

FIG. 6 is a view illustrating a message which is transmitted and received between a vehicle and a traffic signal system according to exemplary embodiment of the present disclosure in a moving state.

The vehicle periodically transmits an ARV message and the traffic signal of the intersection receives the ARV message to confirm that the corresponding vehicle enters. The vehicle checks a traffic signal in the traveling direction of the vehicle. When a traffic signal for the traveling direction of the vehicle is a green signal, the traffic light transmits the SC-C message (to confirm the status C) to the vehicle together with the ARV ACK message. The vehicle receives the ARV ACK and the SC_C while moving and then transmits the SC-C ACK message (a response for SC-C) and the RS. The signal light estimates a moving direction of the vehicle by the RS and transmits VHA to the intersection to which the vehicle travels based on the estimated moving direction. Simultaneously, the signal light corrects and updates the position information of the vehicle using RS and a moving speed and a direction of the vehicle to transmit a LOC message to the vehicle. When the vehicle enters the intersection, if the traffic signal is changed to a red signal, the signal light switches a process to a process for the status A to perform the corresponding process.

In the moving status, the first communication unit of the vehicle periodically transmits the arrival message to the traffic signal system. When the traffic signal in the traveling direction of the vehicle is a green signal, the first communication unit receives an arrival response message and a moving status message from the traffic signal system. The first communication unit transmits the moving status response message and a pilot signal for positioning to the traffic signal system. The signal light which receives the moving status response message transmits a vehicle entry message to a traffic signal of the next intersection in consideration of the position and the moving direction of the vehicle estimated using the pilot signal. The signal light which receives the moving status response message receives a vehicle position message estimated using the pilot signal, the moving speed and the moving direction of the vehicle.

In the moving status, the second communication unit of the traffic signal system receives the arrival message from the vehicle. When the traffic signal for the traveling direction of the vehicle is a green signal, the second communication unit transmits an arrival response message and a moving status message to the vehicle. The second communication unit receives the moving status response message and the pilot signal for positioning from the vehicle. The second processor estimates the position and the moving direction of the vehicle using the pilot signal. The second communication unit transmits the vehicle entry message to a traffic signal of the next intersection. The second communication unit localizes the vehicle using the pilot signal, the moving speed and the moving direction of the vehicle. The second communication unit transmits a vehicle position message for the position of the vehicle to the vehicle.

The vehicle and the traffic signal system may include at least one processor, a computer readable storage medium, and a communication bus.

The processor may control the vehicle and the traffic signal system to operate. For example, the processor may execute one or more programs stored in the computer readable storage medium. One or more programs may include one or more computer executable command and the computer executable command may be configured to allow the vehicle and the traffic signal system to perform the operations according to the exemplary embodiments when it is executed by the processor.

The computer readable storage medium is configured to store a computer executable command or program code, program data and/or other appropriate format of information. The program stored in the computer readable storage medium includes a set of commands which are executable by the processor. In one exemplary embodiment, the computer readable storage medium may be a memory (a volatile memory such as a random access memory, a non-volatile memory, or an appropriate combination thereof), one or more magnetic disk storage devices, optical disk storage devices, flash memory devices, and another format of storage mediums which is accessed by the vehicle and the traffic signal system and stores desired information, or an appropriate combination thereof.

The communication bus connects various components of the vehicle and the traffic signal system including the processor and the computer readable storage medium.

The vehicle and the traffic signal system may include one or more input/output interfaces and one or more communication interfaces which provide an interface for one or more input/output devices. The input/output interface and the communication interface are connected to the communication bus. The input/output device may be connected to the other components of the vehicle and the traffic signal system via the input/output interface.

The vehicle and the traffic signal system may be implemented in a logic circuit by hardware, firm ware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

The vehicle and the traffic signal system may be mounted in a computing device or a server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

In FIGS. 4 to 6, the respective processes are sequentially performed, but this is merely illustrative and those skilled in the art may apply various modifications and changes by changing the order illustrated in FIGS. 4 to 6 or performing one or more processes in parallel or adding another process without departing from the essential gist of the exemplary embodiment of the present disclosure.

The operation according to the exemplary embodiment of the present disclosure may be implemented as a program instruction which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A vehicle, comprising:
a first communication unit which transmits and receives a message to and from a traffic signal system;
a first processor which is connected to the first communication unit, classifies a driving status of the vehicle into a departure status and a moving status, and processes a message which is transmitted and received to and from the traffic signal system in different ways in accordance with the departure status and the moving status; and
a moving device which is connected to the first processor and moves the vehicle,
wherein the traffic signal system includes signal lights installed at a plurality of adjacent intersections, and
in the departure status,
when a traffic signal for a traveling direction of the vehicle is changed to a green signal, the first communication unit receives a departure available message from the traffic signal system,
the first communication unit receives the departure available message and, after a predetermined standby time has elapsed, transmits a departure status response message and a pilot signal for positioning to the traffic signal system, and
the signal light which receives the departure status response message transmits a vehicle entry message to a traffic signal of the next intersection in consideration of the position and the moving direction of the vehicle estimated using the pilot signal.

2. The vehicle according to claim 1, wherein
in the departure status,
without considering the traffic signal for the traveling direction of the vehicle,
the first communication unit transmits the departure status response message and the pilot signal for positioning to the traffic signal system; and
the signal light which receives the departure status response message transmits the vehicle entry message to the traffic signal of the next intersection in consideration of the position and the moving direction of the vehicle estimated using the pilot signal.

3. The vehicle according to claim 1, wherein,
in the moving status,
the first communication unit periodically transmits an arrival message to the traffic signal system,
when the traffic signal in the traveling direction of the vehicle is a green signal, receives an arrival response message and a moving status message from the traffic signal system,
the first communication unit transmits the moving status response message and the pilot signal for positioning to the traffic signal system,
the signal light which receives the moving status response message transmits the vehicle entry message to the traffic signal of the next intersection in consideration of the position and the moving direction of the vehicle estimated using the pilot signal, and
the signal light which receives the moving status response message receives an estimated vehicle position message using the pilot signal, the moving speed and the moving direction of the vehicle.

4. A traffic signal system, comprising:
a communication unit which transmits and receives messages to and from a vehicle; and
a processor which is connected to the communication unit and processes a message which is transmitted and received to and from the vehicle in different ways in accordance with a driving status of the vehicle which is classified into a departure status and a moving status,
wherein the traffic signal system includes signal lights installed at a plurality of adjacent intersections, and
in the departure status,
when a traffic signal for a traveling direction of the vehicle is changed to a green signal, the communication unit transmits a departure available message to the vehicle,
the communication unit receives the departure status response message and the pilot signal for positioning from the vehicle, and
the processor estimates a position and a moving direction of the vehicle using the pilot signal and the communication unit transmits a vehicle entry message to a signal light of the next intersection.

5. The traffic signal system according to claim 4, wherein,
in the departure status,
the communication unit receives the departure status response message and the pilot signal for positioning from the vehicle before transmitting the departure available message to the vehicle.

6. The traffic signal system according to claim 4, wherein
in the moving status,
the communication unit receives an arrival message from the vehicle,
when the traffic signal in the traveling direction of the vehicle is a green signal, the communication unit transmits an arrival response message and a moving status message to the vehicle,
the communication unit receives the moving status response message and the pilot signal for positioning from the vehicle, the processor estimates the position and the moving direction of the vehicle using the pilot signal and the communication unit transmits the vehicle entry message to a signal light of the next intersection, and the processor localizes the vehicle using the pilot signal, the moving speed and the moving direction of the vehicle and the communication unit transmits a vehicle position message for the position of the vehicle to the vehicle.

\* \* \* \* \*